Figure 1:
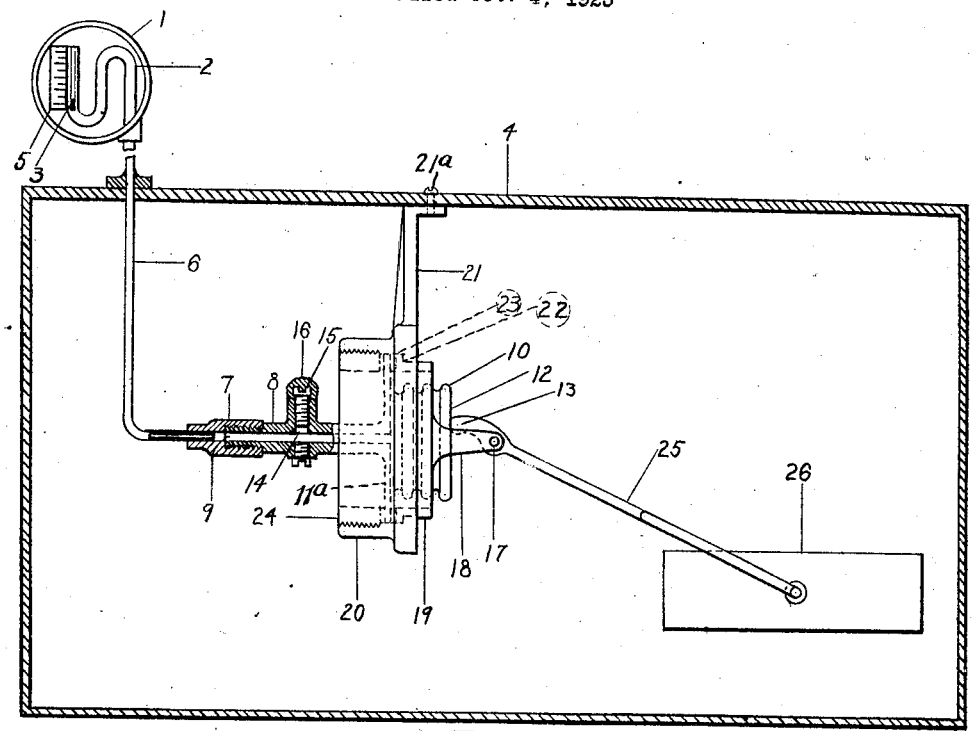

Nov. 23, 1926.  1,607,750

E. V. RIPPINGILLE

LIQUID LEVEL INDICATOR

Filed Oct. 4, 1923

INVENTOR
Edward V. Rippingille
BY Toulmin Toulmin,
ATTORNEYS.

Patented Nov. 23, 1926.

1,607,750

UNITED STATES PATENT OFFICE.

EDWARD V. RIPPINGILLE, OF DETROIT, MICHIGAN, ASSIGNOR TO THE GROLAN MANUFACTURING COMPANY, OF DAYTON, OHIO, A CORPORATION OF DELAWARE.

LIQUID-LEVEL INDICATOR.

Application filed October 4, 1923. Serial No. 666,599.

My invention relates to gauges, and particularly to gauges for measuring the heights of liquids in tanks.

It is the object of my invention to provide a gauge which will indicate upon a remote indicator, located some distance from the tank, the height of the liquid in the tank.

It is an additional object of my invention to provide a mechanism in which this indication will be effected by the difference in pressure on a column of liquid or gas.

It is an additional object of my invention to provide means of regulating the normal pressure of such liquid or gas in the column, and to provide means for changing that pressure after it has been suitably adjusted or calibrated so that the change in pressure when brought about by the change in the height of liquid in the tank will indicate remotely the height of such liquid.

Referring to the drawings:

Figure 1 is a side elevation of the mechanism of my invention installed in a tank.

Figure 4:
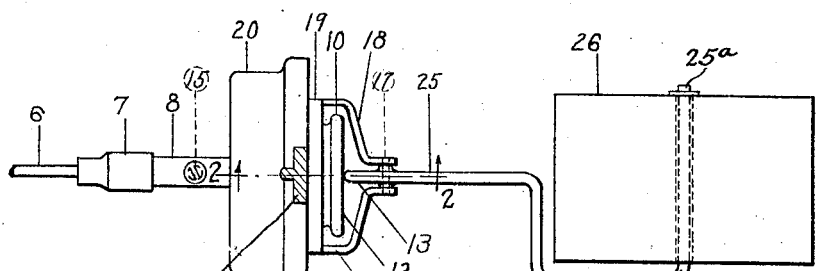
Figure 2:
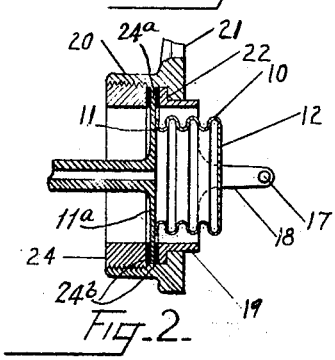

Figure 2 is a detail sectional view on line 2—2 of Fig. 4 with certain parts omitted, showing the ring 20 and the ring 19 with the sylphon attached to a disk or circular plate of the casing 8.

Figure 3:
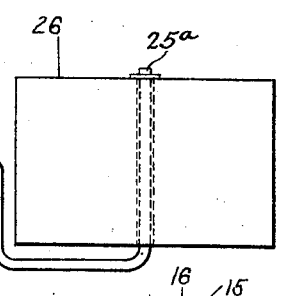

Figure 3 is a detail sectional view of the casing 8, showing the compensating chamber 14, whereby the pressure in the manometer tube may be regulated.

Figure 4 is a plan view of the ring 20, including the casing 8, with the tube 6 broken away, also illustrating the arm 21 in section, and showing the ring 19 including the float arm and float, as well as illustrating a portion of the sylphon.

Referring to the drawings in detail:

1 is an indicator casing having a manometer tube 2, in which the liquid 3 indicates the height of the liquid in a tank 4 on the scale 5 of the indicator. The liquid for actuating the manometer is contained in the tube 6, which is connected by a collar 7 to a tubular casing 8. This casing is provided with a continuation of the tube 6 as at 9, so that the tube communicates directly with the interior of the sylphon 10, which also contains the liquid for actuating the manometer. The sylphon is a resilient casing comprising a metallic cylindrical vessel closed by an integral head at one end and with its cylindrical wall corrugated or of bellows formation to render it flexible to permit contraction and expansion of the vessel. The vessel is made of spring metal, preferably brass, so that it has a tendency to assume its normal shape when freed from deforming pressure. The sylphon is a stock device and is obtainable in the open market. This sylphon is connected at one end in any suitable manner, preferably electrically welded as at 11, to a member 11ª of the casing 8, and at the other end it is closed by the wall 12, against which the cam 13 abuts for the purpose of compressing the sylphon. This casing 8 is also provided with a compensating chamber 14, which is sealed by the screw-plug 15, and the solder 16, after the desired pressure is established in the system. This pressure is established or regulated by the adjustment of the screw-plug 15. After the pressure has been once adjusted, that is, the calibration has been effected, the gauge will remain in such condition unless there is a leakage, whereupon a new calibration can be effected by adjustment or removal of the screw-plug 15.

The cam 13 is mounted pivotally at 17 in a pair of spaced arms 18, which are carried on either side of a ring 19. This ring is carried in a second ring or collar 20, which is suspended by the arm or hanger 21 from the top of the tank 4. The arm 21 is secured to the top of the tank by means of a screw 21ª. The collar 20 not only suspends the ring 19, but also the casing 8. A shoulder 22 is provided on this ring for engaging with a similar shoulder 23 on the ring 19. This positions the several parts in one direction, and a nut 24 threaded on the inside of the collar 20 positions the parts in the other direction. The casing 8, at one end is provided with an integral disk or circular plate 11ª, which is clamped between the ring 19 and the nut 24, as at 24ª, there being suitable packing rings 24ᵇ of any suitable material clamped against the opposite faces of the disk or circular plate 11ª by means of said ring 19 and the nut 24. The disk for circular plate 11ª carries the sylphon, as previously stated.

The cam is mounted on the end of a float arm 25, which has a lateral free end portion 25ª on which a float 26 is rotatably mounted, said float adapted to ride on the surface of the liquid in the tank.

It is thus possible, by the movement of the float upwardly, to compress the sylphon, and thereby actuate the liquid in the manometer and the tube 6, thereby indicating on the indicator 1 a rise of the liquid in the tank 4. A corresponding decrease is indicated on the manometer by the lowering of the float and the expansion of the sylphon.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In a gauge equipment, the combination of a tank to contain liquid and having on its interior a member including a collar depending from the top of the tank, a circular plate with means associated therewith for clamping the plate within the collar with the center of the plate axial with the center of the collar, of a sylphon operatively fastened to one face of the circular plate, and provided with a diaphragm wall, a tubular casing operatively carried by the opposite face of the circular plate and communicating axially with the sylphon, a manometer, a tube containing a liquid and having one end operatively connected with the manometer and the other end operatively connecting with the tubular casing, said tubular casing being provided with a compensating chamber which communicates with the tube and the interior of the sylphon, a device adjustably and operatively arranged in and associated with the compensating chamber, whereby upon manipulating the device, to regulate the pressure within the system, supporting arms operatively associated with the collar and provided with spaced ends, a float arm operatively mounted between the spaced ends of said supporting arms and carrying a float to ride on the surface of the liquid in the tank, said float arm having a cam on its end opposite the float adapted to engage the diaphragm wall and adapted to press the sylphon, whereby when said float moves a change in pressure in the system may be indicated on the manometer.

2. In a gauge equipment, the combination of a tank and a manometer mounted exteriorly thereof, with a resilient casing having a bellows wall tending to return the casing to its normal shape when the casing is free from deforming pressure, a hanger attached to the wall of the tank and supporting the resilient casing within the tank, an elongated tubular element communicating at one end with the resilient casing, said tubular element having a flanged head sealed to one end of the resilient casing, means for clamping the flanged head in the hanger, a pipe connecting the other end of tubular element with the manometer, said manometer and resilient casing together with the pipe and tubular element containing a liquid so that surges imparted to the liquid by deformation of the resilient casing will be transmitted to the indicator of the manometer, a lever pivoted to said support and having at one end a cam to bear on the resilient casing, and a float in the tank connected with the other end of the lever so that rise and fall of the float will actuate the lever to operate the cam to control the deformation of the resilient casing.

In testimony whereof, I affix my signature.

EDWARD V. RIPPINGILLE.